(12) United States Patent
Lin et al.

(10) Patent No.: US 9,016,871 B2
(45) Date of Patent: Apr. 28, 2015

(54) HEAT DISSIPATION STRUCTURE OF PROJECTION DEVICE AND HEAT DISSIPATION METHOD THEREOF

(71) Applicant: Delta Electronics, Inc., Taoyuan Hsien (TW)

(72) Inventors: Chia-Jui Lin, Taoyuan Hsien (TW); Hui-Chih Lin, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 82 days.

(21) Appl. No.: 13/858,516

(22) Filed: Apr. 8, 2013

(65) Prior Publication Data
US 2014/0218694 A1    Aug. 7, 2014

(30) Foreign Application Priority Data
Feb. 7, 2013   (TW) .............................. 102104804 A

(51) Int. Cl.
*G03B 21/16* (2006.01)
*F21V 29/02* (2006.01)

(52) U.S. Cl.
CPC   *G03B 21/16* (2013.01); *F21V 29/02* (2013.01)

(58) Field of Classification Search
CPC ................................. G03B 21/16; F21V 29/02
USPC ..................... 353/57, 58, 69, 70, 119, 60, 61; 362/294, 345, 373
See application file for complete search history.

(56) References Cited

U.S. PATENT DOCUMENTS

| | | | |
|---|---|---|---|
| 2001/0021006 A1* | 9/2001 | Shimizu | 353/57 |
| 2005/0179876 A1 | 8/2005 | Iinuma et al. | |
| 2007/0019168 A1 | 1/2007 | Nakagawa et al. | |
| 2007/0146645 A1 | 6/2007 | Lin et al. | |
| 2007/0296927 A1 | 12/2007 | Chang et al. | |
| 2008/0111976 A1* | 5/2008 | Takito et al. | 353/121 |
| 2010/0177282 A1* | 7/2010 | Nakajima | 353/61 |

FOREIGN PATENT DOCUMENTS

| | | |
|---|---|---|
| CN | 101364035 | 2/2009 |
| JP | 2007-025404 | 2/2007 |
| TW | 200725158 | 7/2007 |
| TW | 200801777 | 1/2008 |

* cited by examiner

*Primary Examiner* — William C Dowling
*Assistant Examiner* — Ryan Howard
(74) *Attorney, Agent, or Firm* — Lowe Hauptman & Ham, LLP

(57) ABSTRACT

A heat dissipation structure of a projection device includes at least one fan, at least one light emitting unit, at least one air guide, and a sensing device. The fan with an outlet is used for providing a cooling flow. The light emitting unit is used for providing a light beam. The air guide is dismountable disposed in front of the outlet. The air guide is used for guiding the cooling flow to a hot spot of the light emitting unit. The sensing device is used for sensing a projection direction of the projection device.

14 Claims, 15 Drawing Sheets

HEAT DISSIPATION STRUCTURE OF PROJECTION DEVICE AND HEAT DISSIPATION METHOD THEREOF

RELATED APPLICATIONS

This application claims priority to Taiwan Application Serial Number 102104804, filed Feb. 7, 2013, which is herein incorporated by reference.

BACKGROUND

1. Technical Field

The present disclosure relates to a heat dissipation structure of a projection device.

2. Description of Related Art

A projection device generates a light beam normally by at least one light emitting unit. The light beam is able to be modulated to be different light beams of image, which are then projected to a screen. Therefore, the light emitting unit is one of an essential element in the projection device. However, the light emitting unit as a heat source can generate huge amount of heat after running for a long time. If the heat fails to be dissipated in time external to the projection device, the temperature of the light emitting unit can be raised to a level capable of reducing the lifetime of the light emitting unit or simply damaging of the light emitting unit. Therefore, the projection device needs to include a heat dissipation device which is able to dissipate the heat efficiently.

A conventional dissipation device may include a fan for guiding cooling flow to the heat source of the light emitting unit so as to dissipate the heat and drop the temperature of the light emitting unit. However, the relative positions of the fan and a hot spot with the highest temperature of the heat source can be different when the projection device is operated at different projection directions. In other words, when the projection device is at certain projection directions, the fan cannot efficiently guide the cooling flow to the hot spot with the highest temperature of the heat source, such that the temperature of the entire heat source of the light emitting unit, or the temperature difference between the highest temperature and the lowest temperature of the heat source, can be overly high to damage the light emitting unit.

SUMMARY

An aspect of the present invention provides a heat dissipation structure of a projection device. The heat dissipation structure of a projection device includes at least one fan, at least one light emitting unit, at least one air guide, and a sensing device. The fan with an outlet is used for providing a cooling flow. The light emitting unit is used for providing a light beam. The air guide is dismountable disposed in front of the outlet and is used for guiding the cooling flow to a hot spot of the light emitting unit. The sensing device is used for sensing a projection direction of the projection device.

In one or more embodiments, the sensing device can be a gravity sensing device.

In one or more embodiments, the light emitting unit and the air guide can be combined to be a light emitting module dismountable disposed in front of the outlet of the fan.

In one or more embodiments, the heat dissipation structure optionally further includes a detection device for detecting if the light emitting module is disposed in front of the outlet of the fan.

In one or more embodiments, the heat dissipation structure optionally further includes a detection device for detecting if the air guide is disposed in front of the outlet of the fan.

In one or more embodiments, the heat dissipation structure optionally further includes a display screen for displaying a detection result of the detection device.

In one or more embodiments, the detection device can include at least one interlock switch.

In one or more embodiments, the heat dissipation structure optionally further includes a display screen for displaying a message of the projection direction of the projection device the sensing device detects.

In one or more embodiments, the projection device can optionally project a frame to a projection screen to show a message of the projection direction of the projection device the sensing device detects.

In one or more embodiments, the light emitting unit can be an ultra high performance lamp.

Another aspect of the present invention provides a dissipation method of a projection device. The dissipation method includes the steps of:

turning on a projection device including at least one fan for generating a cooling flow;

sensing a projection direction of the projection device; and selecting one of a plurality of air guide modules and setting up the air guide module into the projection device according to the projection direction of the projection device to guide the cooling flow to a hot spot of a light emitting unit of the projection device.

In one or more embodiments, the step of sensing the projection direction of the projection device can include the steps of: sensing a gravity direction; and obtaining the projection direction of the projection device according to the gravity direction.

In one or more embodiments, the dissipation method optionally further includes the steps of: checking if the air guide module is correct; and activating the projection device normally if the air guide module is correct.

In one or more embodiments, the dissipation method optionally further includes the steps of: checking if the air guide module is correct; displaying an error message on a display screen of the projection device if the air guide module is not correct; and replacing the air guide module according to the error message and reboot the projection device.

In one or more embodiments, the dissipation method optionally further includes the step of: displaying a message on a display screen of the projection device according to the projection direction of the projection device.

In one or more embodiments, the dissipation method optionally further includes the step of: projecting a frame onto a projection screen for displaying a message according to the projection direction of the projection device.

The above steps are not recited in the sequence in which the steps are performed. That is, unless the sequence of the steps is expressly indicated, the sequence of the steps is interchangeable, and all or part of the steps may be simultaneously, partially simultaneously, or sequentially performed.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
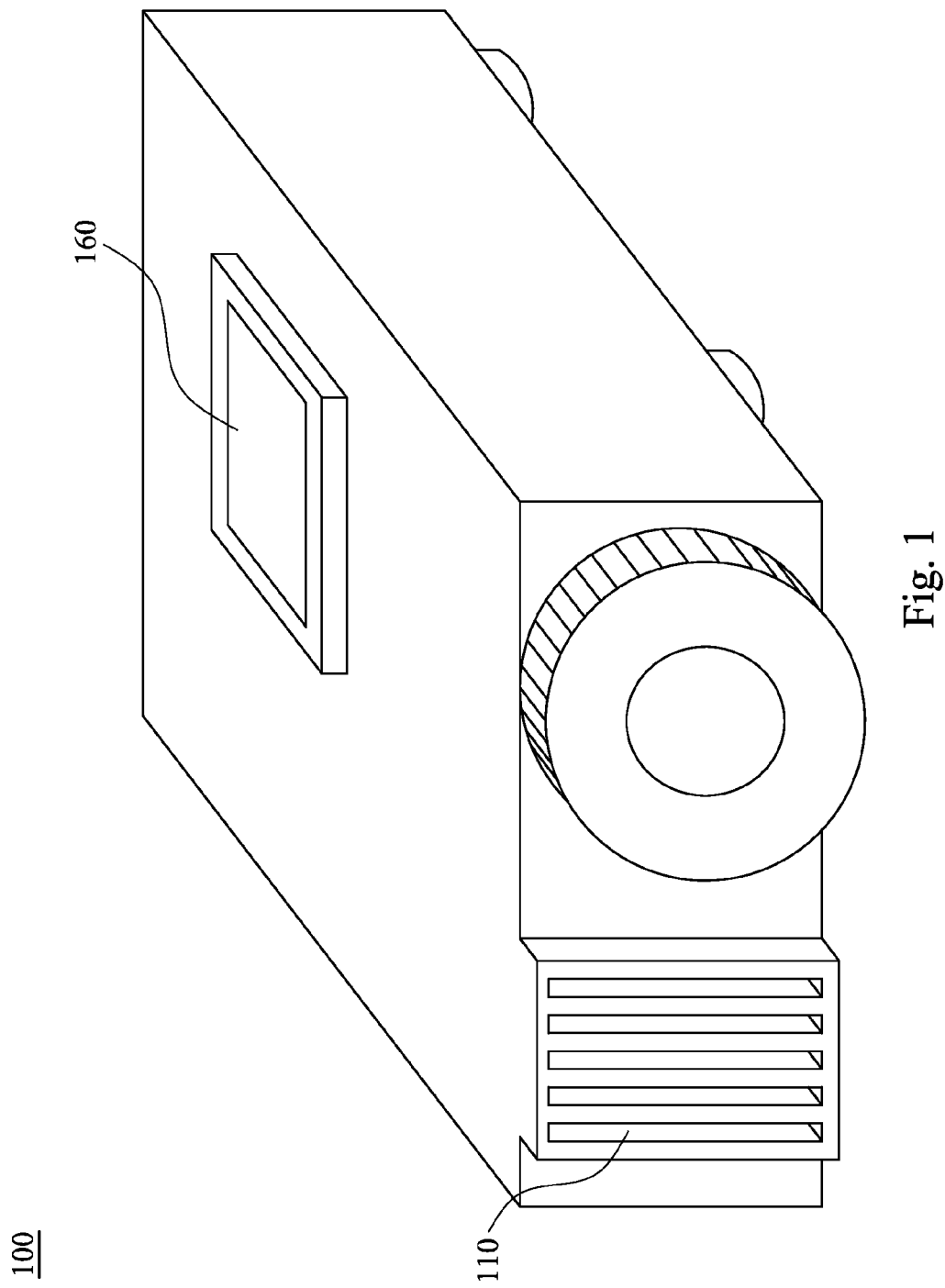
FIG. 1 is a schematic diagram of a projection device according to one embodiment of the present invention.
Figure 2:
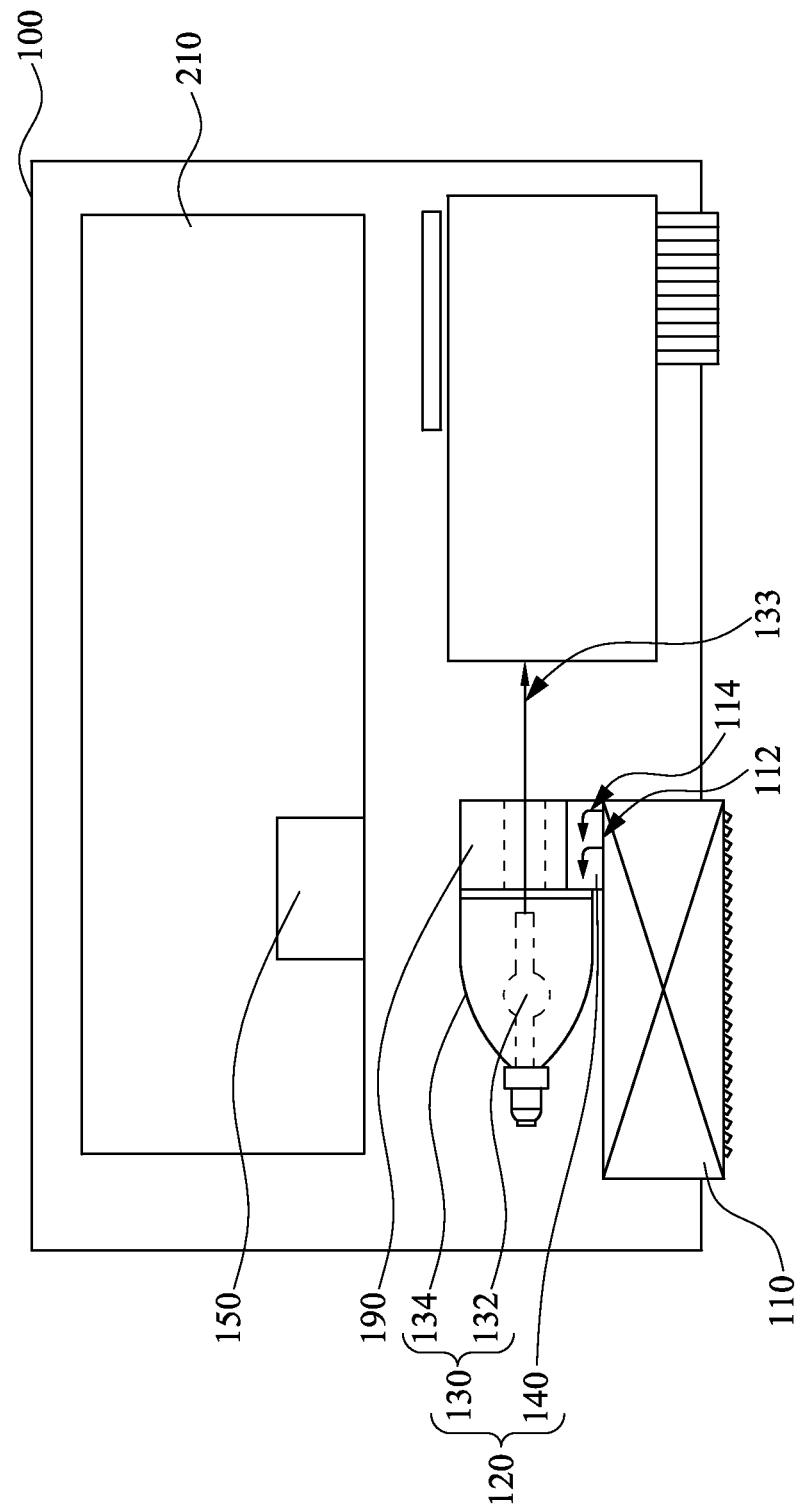
FIG. 2 is a perspective top view of the projection device of FIG. 1.

FIG. 1 is a schematic diagram of a projection device 100 according to one embodiment of the present invention. FIG. 2 is a perspective top view of the projection device 100 of FIG. 1. The heat dissipation structure of a projection device 100 includes at least one fan 110, at least one light emitting unit 130, at least one air guide 140, and a sensing device 150. The fan 110 has an outlet 112, and is used for providing a cooling flow 114. The light emitting unit 130 is used for providing a light beam 133. The air guide 140 is dismountable disposed in front of the outlet 112 of the fan 110, and is used for guiding the cooling flow 114 to a hot spot of the light emitting unit 130. The sensing device 150 is used for sensing a projection direction of the projection device 100.

In this embodiment, the light emitting unit 130 can be an ultra high performance (UHP) lamp. The light emitting unit 130 includes a bulb 132 and a lamp cover 134. The bulb 132 is used for providing the light beam 133, so the bulb 132 is a heat source of the light emitting unit 130. The lamp cover 134 is used for reflecting the light beam 133, such that the light beam 133 is guided to an optical module of the projection device 100. In addition, the lamp cover 134 can further guide the cooling flow 114 transmitted from the air guide 140 to the hot spot of the bulb 132, such that the cooling flow 114 can drop the temperature of the bulb 132.

In specifically, the projection device 100 can be arranged with different air guides 140 according to different projection directions. These air guides 140 with different structures are used for respectively guiding the cooling flow 114 to the hot spot with the highest temperature of the bulb 132 to drop the temperature of the bulb 132 when the projection device 100 is under different projection directions. When the projection device 100 is under a certain projection direction, the sensing device 150 can sense the projection direction and feed the matched air guide 140 back to a user. Hence, the user can set the matched air guide 140 into the projection device 100, such that the cooling flow 114 can be guided to the hot spot with the highest temperature of the bulb 132. Therefore, since the projection device 100 with the aforementioned heat dissipation structure can be used under a plurality of projection directions, such as 0°~360°, the projection device 100 has wider applications comparing to the general projection devices.

However, in other embodiments, the light emitting unit 130 and the air guide 140 can be combined to be a light emitting module 120. The light emitting module 120 can be dismountable disposed in front of the outlet 112 of the fan 110. In specifically, since the air guide 140 is disposed in front of the outlet 112 of the fan 110, the user have to open the projection device 100 to set up the air guide 140. However, for some small-sized projection devices, such as a compact projection device, the internal elements thereof are small-sized and complicated, and so as the size of the air guide 140. Therefore, set the air guide 140 alone not only may touch the other elements, but also the cooling flow 114 may be guided to other places if the setting position of the air guide 140 is shift. For this reason, the light emitting unit 130 and the air guide 140 can be combined to be the light emitting module 120 to fix the guiding direction of the cooling flow 114 when the light emitting module 120 is set into the projection device 100. Furthermore, a side of the projection device 100 can have an open, such that the light emitting module 120 can be pushed into the projection device 100 from the open.

In one or more embodiments, the sensing device 150 can be a gravity-sensing device. Since the hot spot with the highest temperature of the bulb 132 can shift according to the projection direction, i.e., the position of the hot spot with the highest temperature of the bulb 132 depends on the projection direction which is related to the gravity direction of the projection device 100, it is a direct method to sense the projection direction by sensing the gravity direction. However, the aforementioned method does not limit the scope of the present invention.

In one or more embodiments, the projection device 100 can further include a display screen 160 (see FIG. 1). The display screen 160 is used for display a message which is related to the projection direction of the projection device 100 sensed by the sensing device 150. The message may be the gravity direction of the projection device 100, such that the user can select the matched air guide 140 according to the gravity direction displayed on the display screen 160, and set the air guide 140 into the projection device 100. The message may be the type of the matched air guide 140 corresponded to the certain projection direction of the projection device 100. The user can pick the air guide 140 shown on the display screen 160 and set into the projection device 100. However, the message can project onto a projection screen by the projection device 100 itself, and the present invention is not limited to the methods mentioned above.

Figure 3:
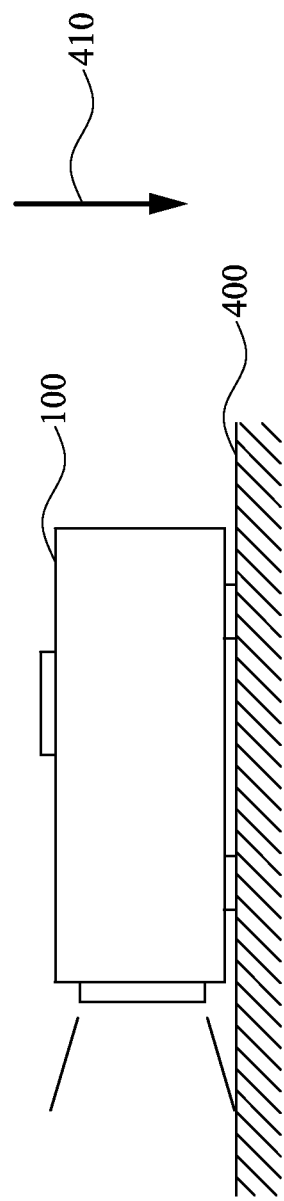
FIG. 3 is a schematic diagram of the projection device of FIG. 1 disposed horizontally.
Figure 4:
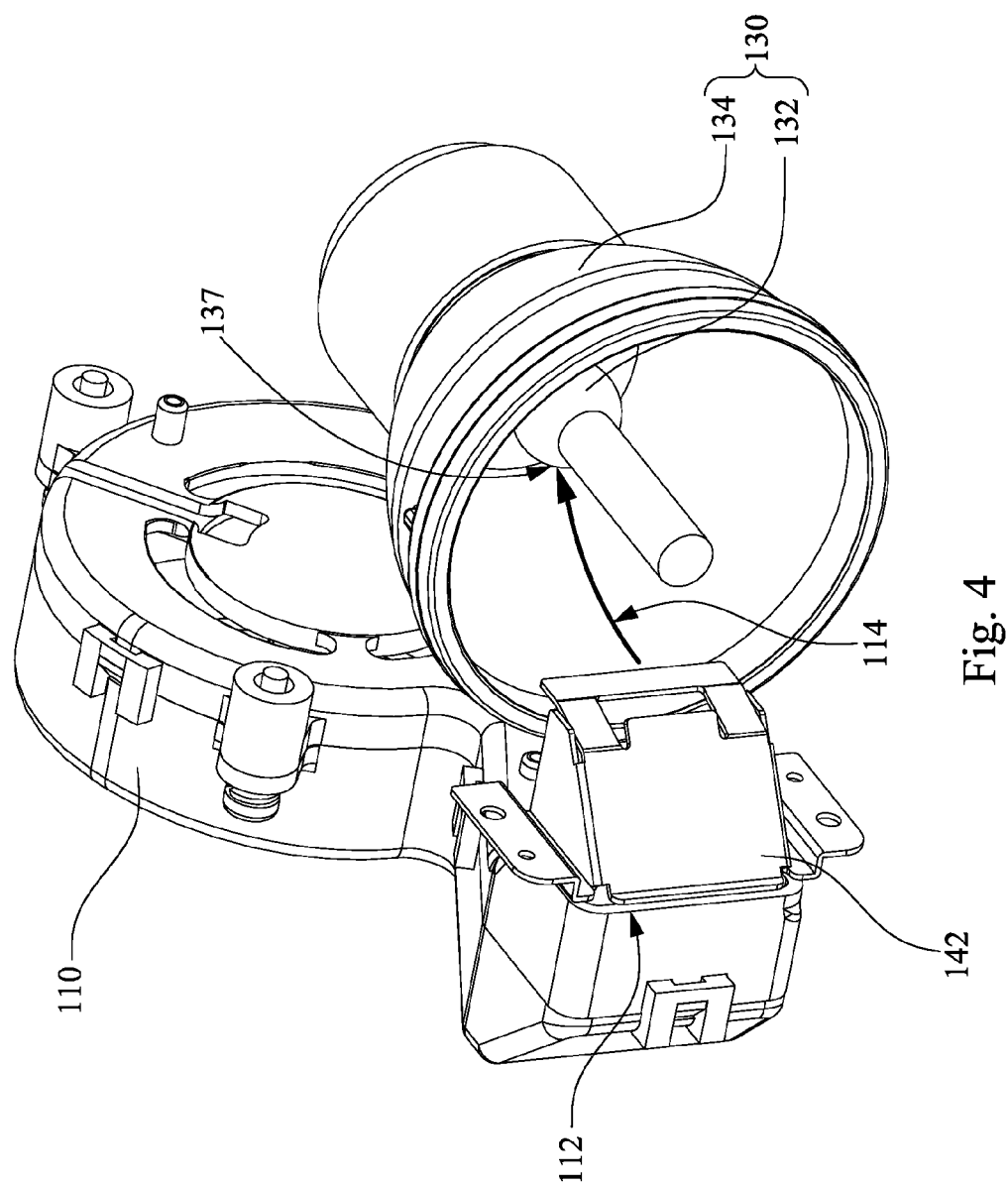
FIG. 4 is a schematic diagram of a fan, an air guide, a light emitting unit of the projection device of FIG. 3.
Figure 5:
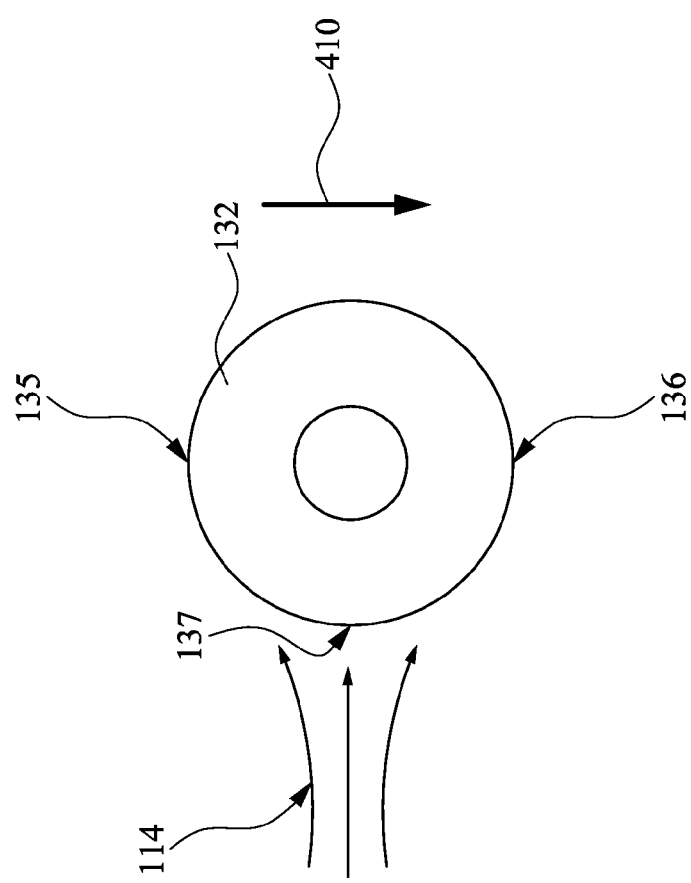
FIG. 5 is a front view of a bulb of FIG. 4.

The details of how the air guide 140 of the projection device 100 guides the cooling flow 114 under different projection directions are described in the following. FIG. 3 is a schematic diagram of the projection device 100 of FIG. 1 disposed horizontally, wherein "disposed horizontally" means the orientation of the projection device 100 disposed on a plane 400 is at an angle of 0 degree, i.e., the projection device 100 is disposed on the plane 400 normally, or is at an angle of 180 degrees, i.e., the projection device 100 is disposed on the plane 400 upside down, and a gravity direction 410 is substantially perpendicular to an extensional direction of the plane 400. FIG. 4 is a schematic diagram of the fan, the air guide, and the light emitting unit of the projection device 100 of FIG. 3. An air guide 142 can be disposed in front of the outlet 112 when the projection device 100 is horizontally disposed on the plane 400. The air guide 142 can guide the cooling flow 114 along the inner wall of the lamp cover 134 to a side portion 137 of the bulb 132, such that the cooling flow 114 can drop the temperature of the bulb 132. Reference is made to FIG. 5, which is a front view of the bulb 132 of FIG. 4. The top side of the bulb 132, i.e., a side portion 135 in this embodiment, is the hot spot with the highest temperature of the bulb 132. The temperature of the hot spot should be lower than a certain value which depends on the type of the bulb 132, and the temperature difference between the top side and the bottom side of the bulb 132, i.e., a side portion 136 in this embodiment, should be maintained in a certain range to prevent the damage of the bulb 132. For example, for the bulb 132 in this embodiment, the highest temperature at the top side can be 890 degrees, and the temperature at the bottom side can be 730 degrees, and the temperature difference of the top side and the bottom side can be 130 degrees, but the temperatures should not limit the scope of the present invention. In this embodiment, the cooling flow 114 is guided to the side portion 137 of the bulb 132, and then the cooling flow 114 flows to the top side of the bulb 132, i.e., the side portion 135, and the bottom side of the bulb 132, i.e., the side portion 136, along the outer wall of the bulb 132, respectively. Although the component of the cooling flow 114 flowing to the bottom side of the bulb 132, i.e., the side portion 136, is more than the component of the cooling flow 114 flowing to the top side of the bulb 132, i.e., the side portion 135, due to the gravity as marked as the gravity direction 410 shown in FIG. 5, the heat at the top side of the bulb 132, i.e., the side portion 135, and the bottom side of the bulb 132, i.e., the side portion 136, can still be dissipated. Therefore, the damage of the bulb 132 due to high temperature can be prevented.

Figure 6:
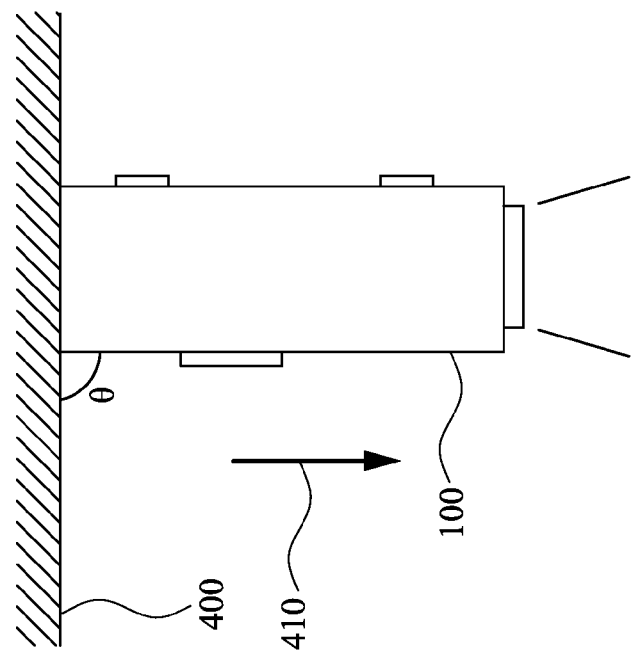
FIG. 6 is a schematic diagram of the projection device of FIG. 1 disposed vertically.
Figure 7:
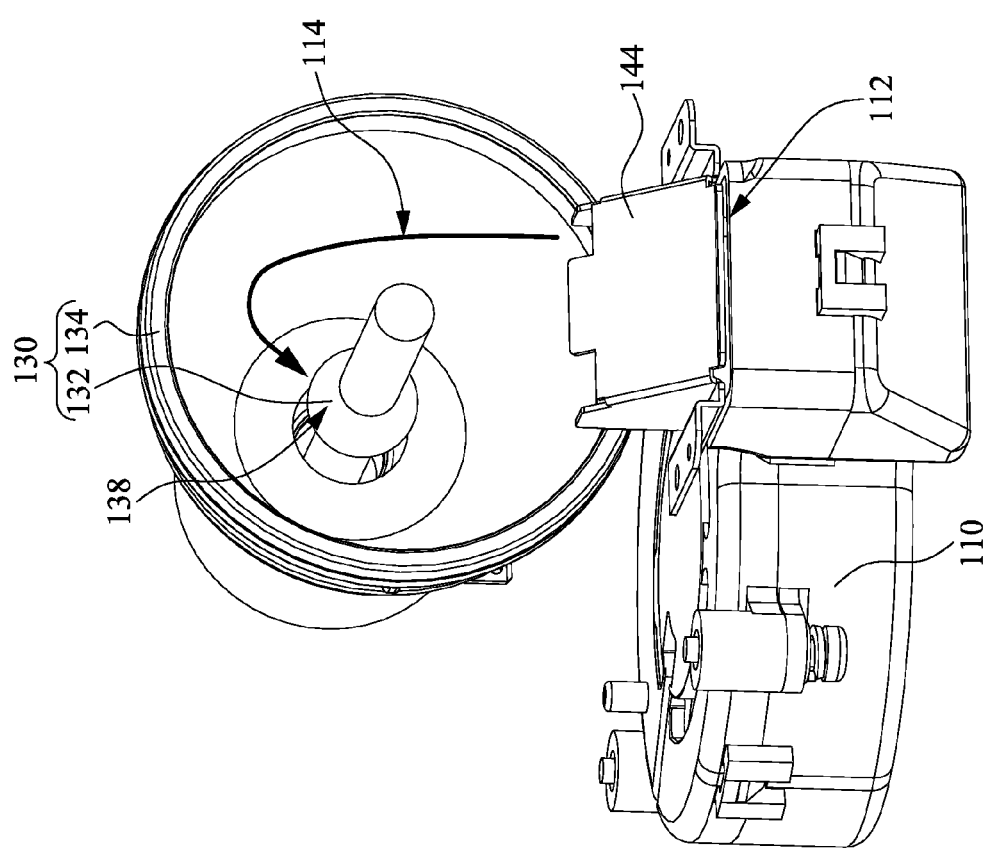
FIG. 7 is a schematic diagram of the fan, the air guide, and the light emitting unit of the projection device of FIG. 6.
Figure 8:
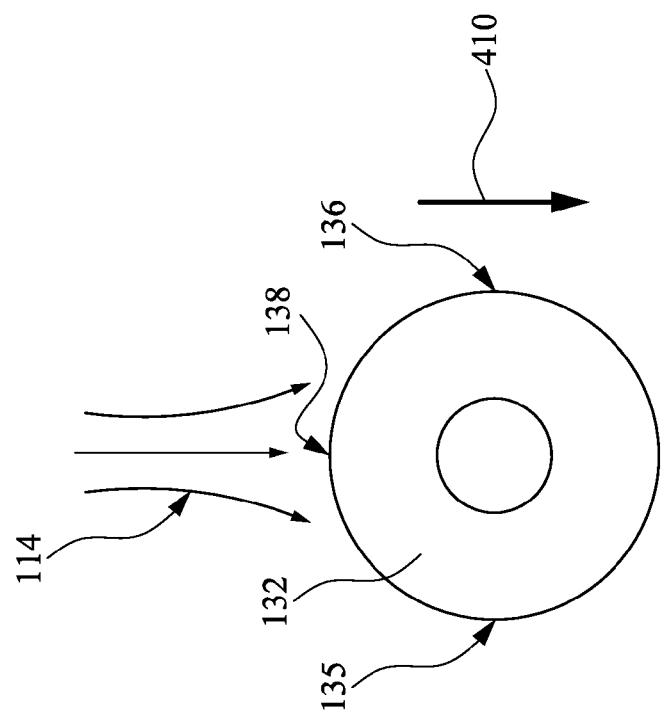
FIG. 8 is a front view of the bulb of FIG. 7.

FIG. 6 is a schematic diagram of the projection device 100 of FIG. 1 disposed vertically. In this embodiment, an angle θ of the orientation of the projection device 100 relative to the plane 400 is 270 degrees (−90 degrees), i.e., the projection device 100 projects to the same direction as the gravity direction 410. FIG. 7 is a schematic diagram of the fan, the air guide, and the light emitting unit of the projection device 100 of FIG. 6. An air guide 144 can be disposed in front of the outlet 112 of the fan 110 when the angle θ as marked in FIG. 6 is 270 degrees. The air guide 144 can guide the cooling flow 114 to a side portion 138 of the bulb 132 along the inner wall of the lamp cover 134, such that the cooling flow 114 can drop the temperature of the bulb 132. Reference is made to FIG. 8, which is a front view of the bulb 132 of FIG. 7. In this embodiment, the hot spot with the highest temperature of the bulb 132 is at the top side of the bulb 132, i.e., the side portion 138 of the bulb 132. The cooling flow 114 is guided to the side portion 138 of the bulb 132, and then flows to the side portions 135 and 136 along the outer wall of the bulb 132, respectively. Therefore, the temperature of the top side of the bulb 132, i.e., the side portion 138, can be dropped, and the damage of the bulb 132 due to high temperature can be prevented.

It should be noticed that the air guide 144 as shown in FIG. 7 can mainly guide the cooling flow 114 to the side portion 138 of the bulb 132, so the air guide 144 can be used in the projection device 100 when the projection device 100 disposed horizontally. In specifically, the air guide 144 can guide the cooling flow 114 to a side of the bulb 132, i.e., the side portion 138 of the bulb 132 when the projection device 100 is disposed horizontally. The cooling flow 114 can then flow to the side portions 135 and 136 along the outer wall of the bulb 132, respectively. Since the side portion 135 is the top side of the bulb 132 as shown in FIG. 5, i.e., the hot spot with highest temperature of the bulb 132, when the projection device 100 is disposed horizontally, the air guide 144 can dissipate the heat as the air guide 142 when the projection device 100 is disposed horizontally.

Figure 9:
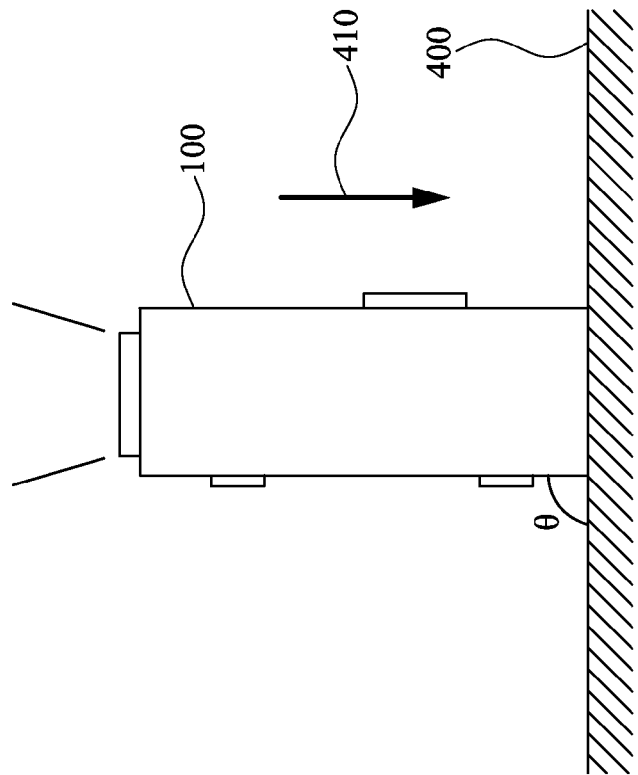
FIG. 9 is a schematic diagram of the projection device of FIG. 1 disposed vertically according to another embodiment of the present invention.
Figure 11:
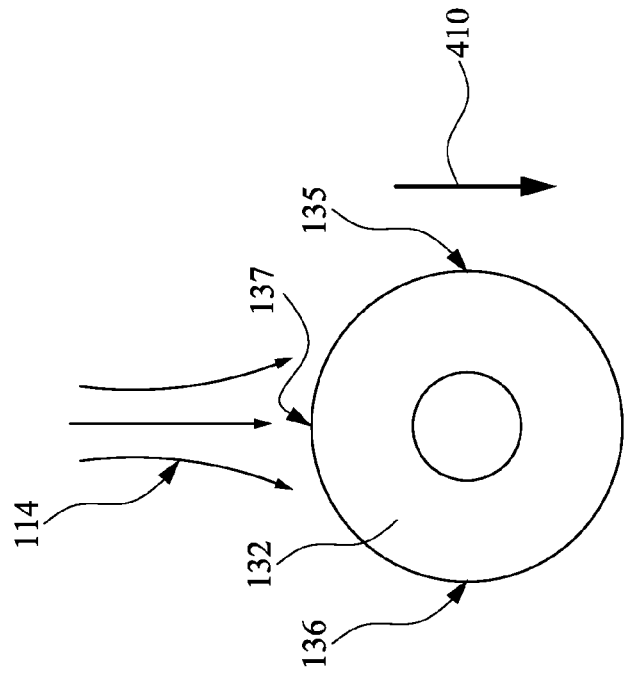
FIG. 11 is a front view of the bulb of FIG. 10.
Figure 10:
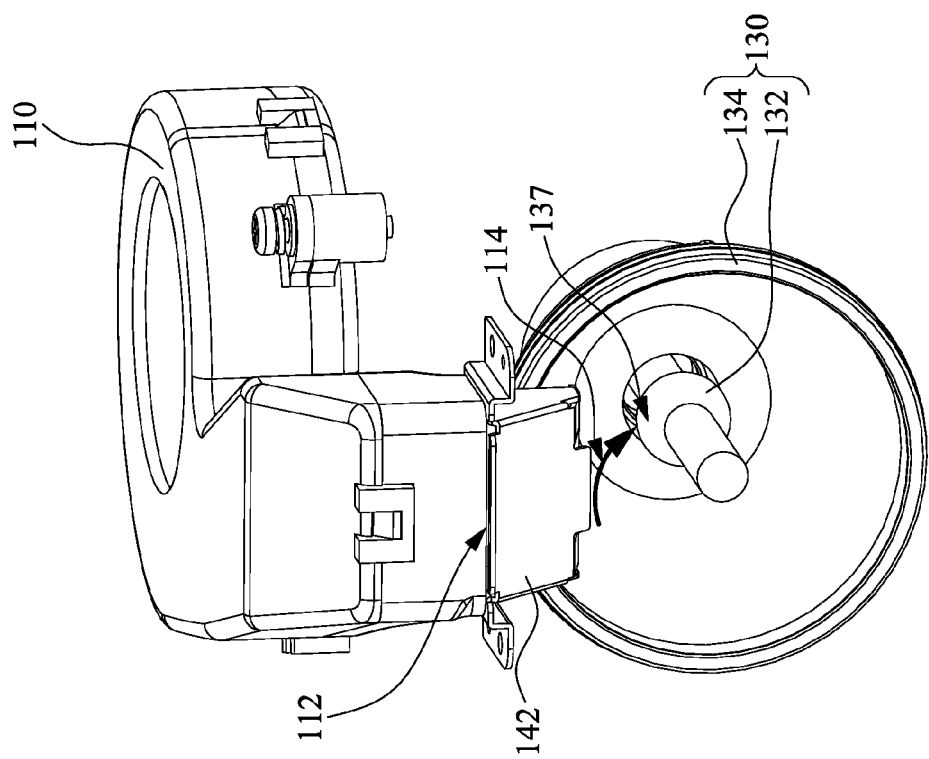
FIG. 10 is the fan, the air guide, and light emitting unit of the projection device of FIG. 9.

FIG. 9 is a schematic diagram of the projection device 100 of FIG. 1 disposed vertically according to another embodiment of the present invention. In this embodiment, the angle θ of the orientation of the projection device 100 relative to the plane 400 is 90 degrees, i.e., the projection device 100 projects to the opposite direction as the gravity direction 410. FIG. 10 is the fan, the air guide, and the light emitting unit of the projection device 100 of FIG. 9. The air guide 142 can be disposed in front of the outlet 112 of the fan 110 when the angle θ as marked in FIG. 9 is 90 degrees. The air guide 142 can guide the cooling flow 114 to a side portion 137 of the bulb 132 along the inner wall of the lamp cover 134, such that the cooling flow 114 can drop the temperature of the bulb 132. Reference is made to FIG. 11, which is a front view of the bulb 132 of FIG. 10. In this embodiment, the hot spot with the highest temperature of the bulb 132 is at the top side of the bulb 132, i.e., the side portion 137 of the bulb 132. The cooling flow 114 is guided to the side portion 137 of the bulb 132, and then flows to the side portions 135 and 136 along the outer wall of the bulb 132, respectively. Therefore, the temperature of the top side of the bulb 132, i.e., the side portion 137, can be dropped, and the damage of the bulb 132 due to high temperature can be prevented.

It should be understood that the air guides 142 and 144 are illustrative only, and should not limit the scope of the present invention. In the real applications, different air guides can be disposed in the projection device 100 according to different projection directions, such that the air guides can guide the cooling flow 114 to the hot spot with the highest temperature of the light emitting unit 130 efficiently under any projection direction.

Figure 12:
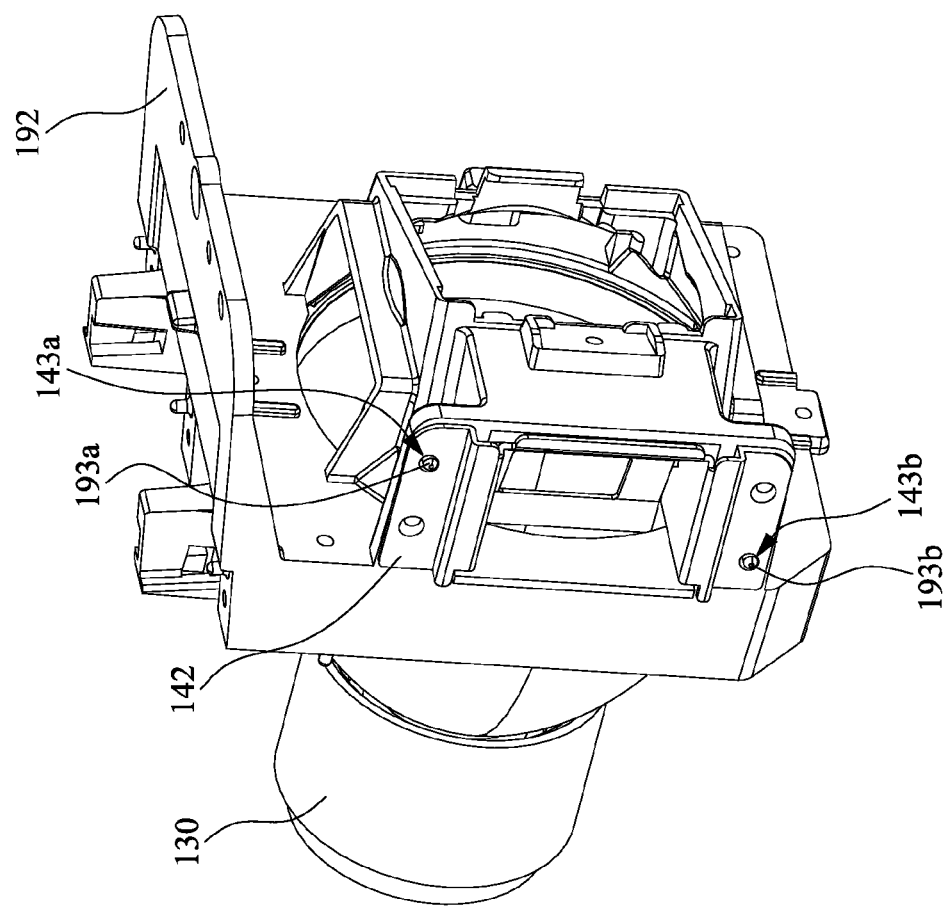
FIG. 12 is a schematic diagram of the light emitting unit, the air guide, and a detection device of FIG. 2 according to one embodiment of the present invention.
Figure 13:
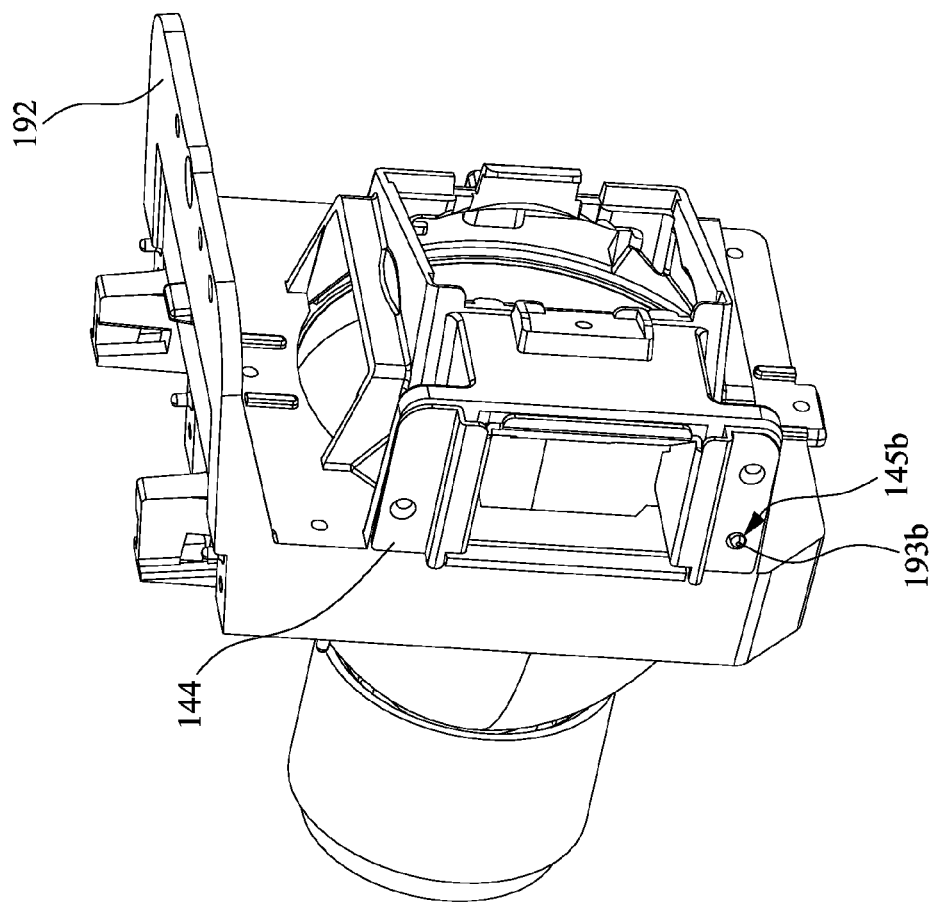
FIG. 13 is a schematic diagram of the light emitting unit, the air guide, and the detection device of FIG. 2 according to another embodiment of the present invention.

Reference is made back to FIG. 2. The projection device 100 can further include a detection device 190 for detecting if the air guide 140 is disposed in front of the outlet 112 of the fan 110 in order to make sure the correct air guide 140 is disposed in the projection device 100 under any projection direction. In specifically, FIG. 12 is a schematic diagram of the light emitting unit 130, the air guide 140, and the detection device 190 of FIG. 2 according to one embodiment of the present invention. In this embodiment, the air guides 142 and 144 (see FIG. 13) can be dismountable disposed in front of the outlet 112 (see FIG. 2) of the fan 110. The detection device can be a first frame 192 which can feed the detection result back to a processing unit 210 of the projection device 100 (see FIG. 2). The first frame 192 fixed in the projection device 100 is used for fix the position of the light emitting unit 130, and the air guides 142 and 144 can be set on the first frame 192. In other words, in this embodiment, the light emitting unit 130 is fixed in the projection device 100 with the first frame 192, and the air guide 140 can be fixed in front of the outlet 112 of the fan 110 through setting on the first frame 192. The first frame 192 includes two interlock switches 193a and 193b, and the air guide 142 has holes 143a and 143b. The positions of the holes 143a and 143b are corresponding to the interlock switches 193a and 193b respectively when the air guide 142 is set on the first frame 192. Since the air guide 142 does not press the interlocks 193a and 193b, the detection device, i.e., the first frame 192, can determine the air guide 142. Reference is made to FIG. 13, which is a schematic diagram of the light emitting unit 130, the air guide 140, and the detection device 190 of FIG. 2 according to another embodiment of the present invention. The air guide 144 has holes 145b corresponding to the interlock switch 193b when the air guide 144 is set on the first frame 192. Since the air guide 144 can press the interlock switch 193a (see FIG. 12) of the first frame 192 when the air guide 144 is set on the first frame 192, the detection device, i.e., the first frame 192, can determine the air guide 144 through the pressed interlock switch 193a and unpressed interlock switch 193b. However, the interlock switches 193a, 193b, and the holes 143a, 143b, and 145b are illustrative only, and should not limit the scope of the present invention. A person has ordinary skill in the art can design the positions and the numbers of the interlock switches and the holes according to the real requirements.

Reference is made back to FIG. 2. The detection device 190 can feed the detection results back to the processing unit 210 of the projection device 100. The processing unit 210 can determine if the air guide 140 set in the projection device 100 is correct, or determine if the air guide 140 can guide the cooling flow 114 to the hot spot with the highest temperature of the bulb 132 by comparing the sensing result of the sensing device 150. In addition, the processing unit 210 can transmit the detection result to the display screen 160 shown in FIG. 1, or the projection device 100 can project a frame to the projection screen to show the detection result. Therefore, the user can determine if the air guide 140 needs to be reset according to the message displaying on the display screen 160 or the projection screen. However, the detection result, i.e., the air guide 140 set on the detection device 190, can be displayed on the display screen 160 or projected on the projection screen. The aforementioned methods do not limit the scope of the present invention.

Figure 14:
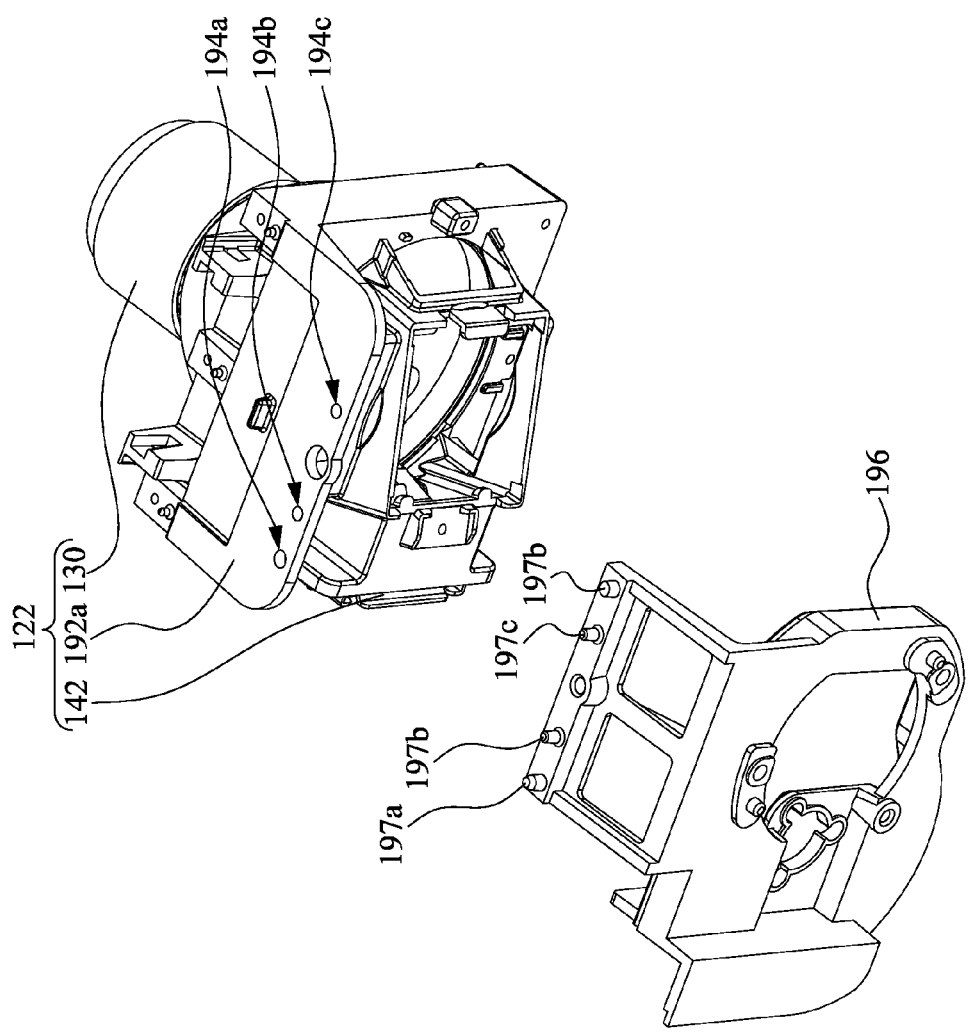
FIG. 14 is a schematic diagram of the light emitting unit, the air guide, and the detection device of FIG. 2 according to yet another embodiment of the present invention.
Figure 15:
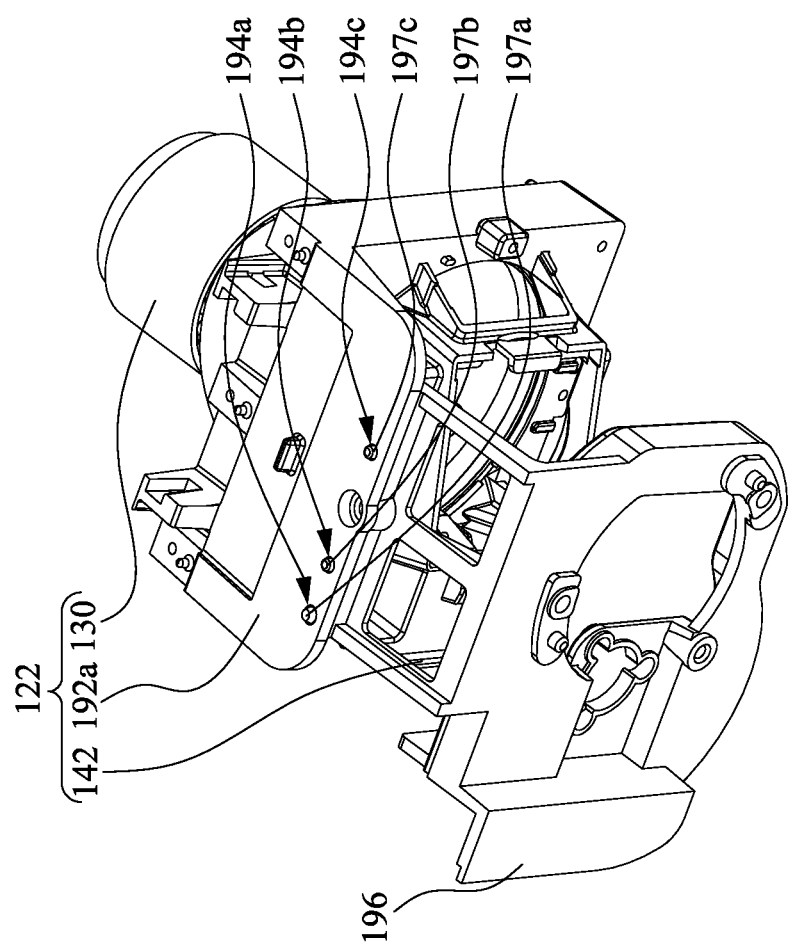
FIG. 15 is a schematic diagram of the light emitting module coupling to a second frame of FIG. 14.
Figure 16:
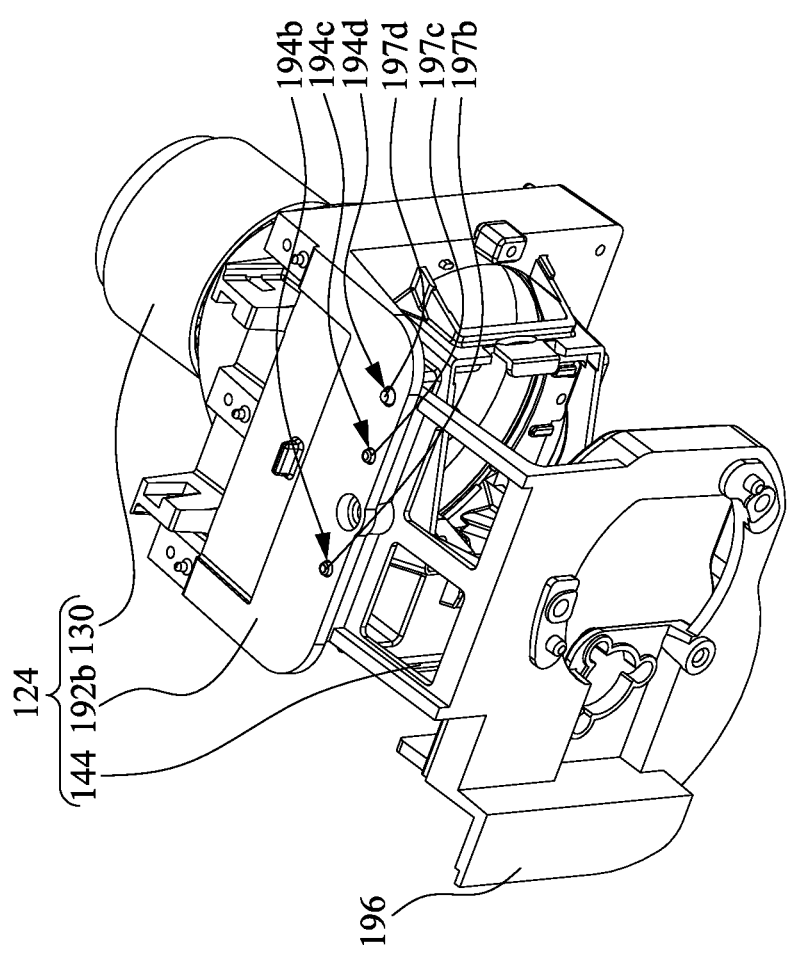
FIG. 16 is a schematic diagram of the light emitting unit, the air guide, and the detection device of FIG. 2 according to yet another embodiment of the present invention.

FIG. 14 is a schematic diagram of the light emitting unit 130, the air guide 140, and the detection device 190 of FIG. 2 according to yet another embodiment of the present invention. In this embodiment, the light emitting module 122 includes the light emitting unit 130, the air guide 142, and the first frame 192a. The detection device can be a second frame 196 for feeding the detection result back to the processing unit 210 of the projection device 100 (see FIG. 2). The second frame 196 is fixed in the projection device 100, and both of light emitting modules 122 and 124 (see FIG. 16) can be set on the second frame 196 to be fixed in the projection device 100. The second frame 196 includes four interlock switches 197a, 197b, 197c, and 197d, and the first frame 192a has holes 194a, 194b, and 194c. Reference is made to FIG. 15, which is a schematic diagram of the light emitting module 122 coupling to the second frame 196 of FIG. 14. When the light emitting module 122 is set in the second frame 196, the holes 194a, 194b, and 194c are corresponding to the interlock switches 197a, 197b, and 197c, respectively. However, the interlock switch 197d (see FIG. 14) is pressed by the light emitting module 122. Therefore, the detection device, i.e., the second frame 196, can determine the light emitting module 122. Reference is made to FIG. 16, which is a schematic diagram of the light emitting unit 130, the air guide 140, and the detection device 190 of FIG. 2 according to yet another embodiment of the present invention. The light emitting module 124 includes the light emitting unit 130, the air guide 144, and the first frame 192b. The first frame 192b has holes 194b, 194c, and 194d. When the light emitting module 124 is set on the second frame 196, the positions of the holes 194b, 194c, and 194d are corresponding to the interlock switches 197b, 197c, and 197d, respectively. However, the interlock switch 197a (see FIG. 14) is pressed by the light emitting module 122. Therefore, the detection device, i.e., the second frame 196, can to determine the light emitting module 124. However, the interlock switches 197a, 197b, 197c, and 197d, and the holes 194a, 194b, 194c, and 194d are illustrative only, and should not limit the scope of the present invention. A person has ordinary skill in the art can design the positions and the numbers of the interlock switches and the holes according to the real requirements.

Reference is made back to FIG. 2. The detection device 190 can feed the detection results back to the processing unit 210 of the projection device 100. The processing unit 210 can determine if the light emitting module 120 set in the projection device 100 is correct by comparing the sensing result of the sensing device 150. In addition, the processing unit 210 can transmit the detection result to the display screen 160 shown in FIG. 1, or the projection device 100 can project a frame to a projection screen to show the detection result. Therefore, the user can determine if the light emitting module 120 needs to be reset according to the message displaying on the display screen 160 or the projection screen. However, the detection result, i.e., the type of the light emitting module 120 set on the detection device 190, can be displayed on the display screen 160 or projected on the projection screen directly. The aforementioned methods do not limit the scope of the present invention.

Moreover, although the detection device 190 is used for detecting if the air guide 140 or the light emitting module 120 is correct through the interlock switches, the interlock switches do not limit the scope of the present invention. In one or more embodiments, both of the air guide 140 and the detection device 190 can include a plurality of pins, wherein different air guides 140 has different combinations of the pins. When the air guide 140 couples to the detection device 190, the pins respectively on the air guide 140 and the detection device 190 contact and connect to each other, such that the detection device 190 can determine the type of the air guide 140. In addition, the light emitting module 120 can also includes a plurality of pins, wherein different light emitting modules 120 have different combinations of the pins, such that the detection device 190 can determine the type of the type of the light emitting module 120 when the light emitting module 120 couples to the detection device 190.

Figure 17:
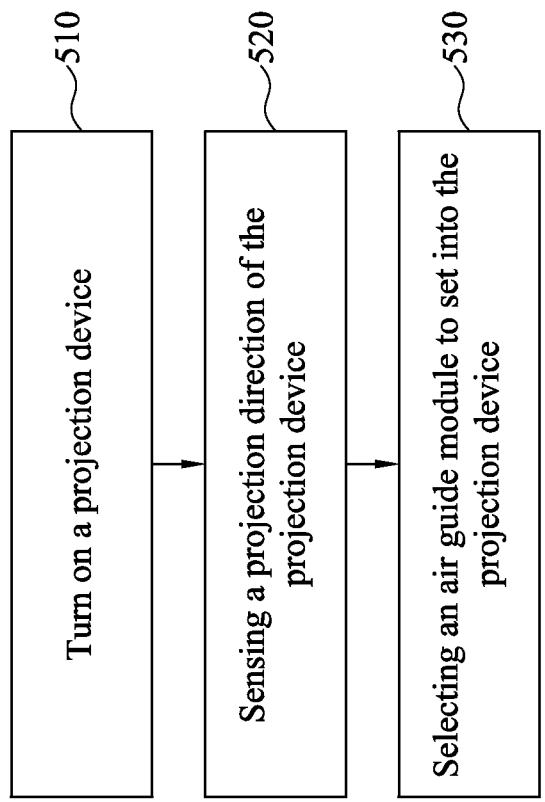
FIG. 17 is a flow chart of a heat dissipation method of the projection device according to one embodiment of the present invention.

Another aspect of the present invention provides a heat dissipation method of a projection device. FIG. 17 is a flow chart of the heat dissipation method of the projection device according to one embodiment of the present invention. First, an user can turn on the projection device, as shown in step 510. The projection device includes at least one fan for generating a cooling flow. After turning on the projection device, a projection direction of the projection device can be sensed, as shown in step 520. In specifically, the sensing method may observe the projection direction of the projection device through eye measurement of the user, or sense the projection direction of the projection device by the projection device itself. For example, the projection device can sense the gravity direction of the projection device, and obtain the projection direction of the projection device according to the gravity direction. Next, the user can select an air guide module from a plurality of air guide module according to the projection direction of the projection device, and set into the projection device to guide the cooling flow to a light emitting unit of the projection device, as shown in step 530. The air guide module can be an air guide or a light emitting module, wherein the light emitting module includes the light emitting unit and the air guide, and the light emitting unit is a heat source of the projection device. Therefore, the user can select the air guide module according to the projection direction of the projection device, and set into the projection device. Since different air guide modules have different structures, the air guide module can guide the cooling flow to the hot spot with the highest temperature of the heat source efficiently under any projection direction of the projection device to drop the temperature of the light emitting unit.

Figure 18:
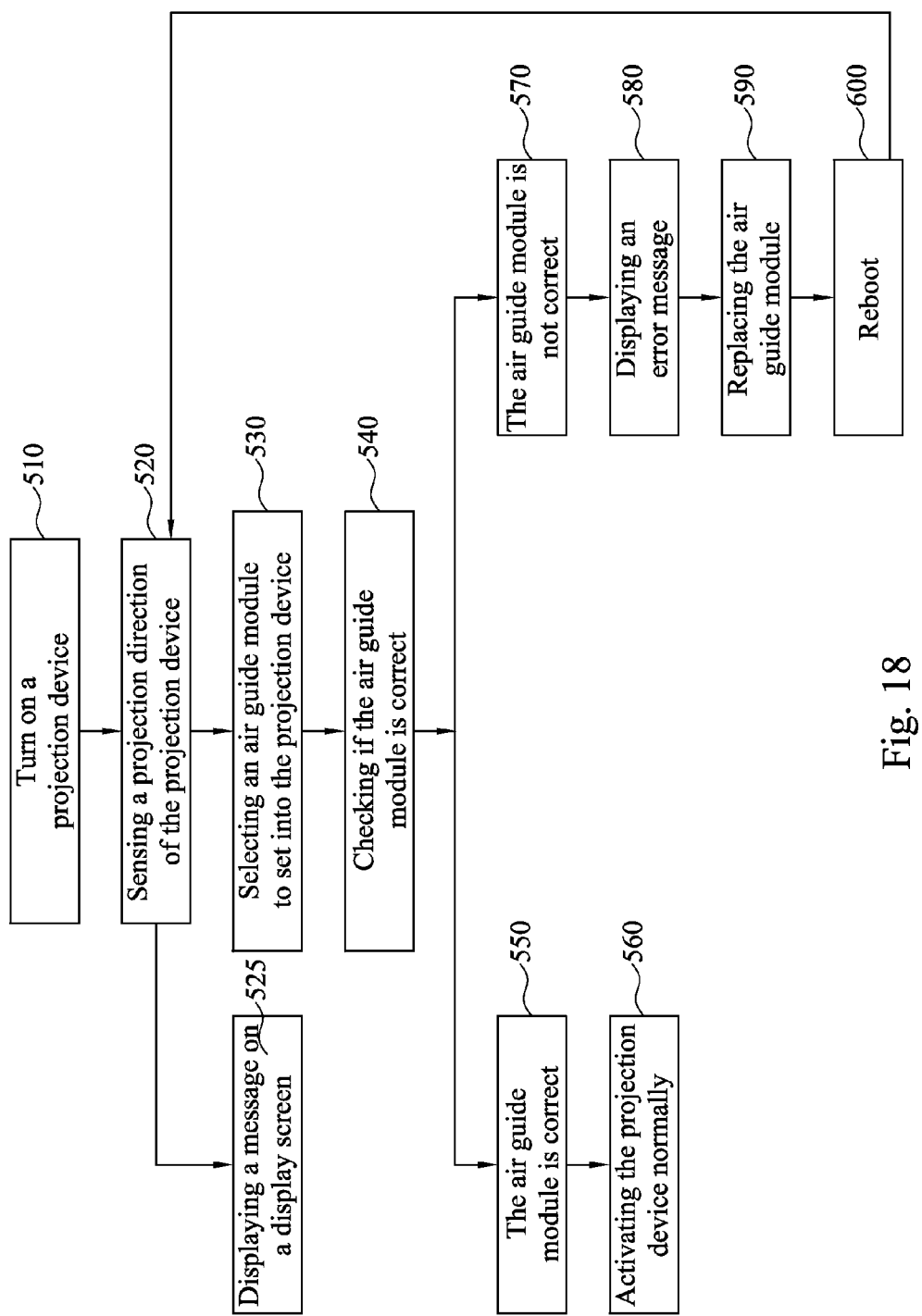
FIG. 18 is a flow chart of the heat dissipation method of the projection device according to another embodiment of the present invention.

FIG. 18 is a flow chart of the heat dissipation method of the projection device according to another embodiment of the present invention. First, an user can turn on the projection device, as shown in step 510. After turning on the projection device, a projection direction of the projection device can be sensed, as shown in step 520. If the projection direction of the projection device is sensed by the projection device itself, then display a message on a display screen of the projection device according to the projection direction, as shown in FIG. 525. The message may be the gravity direction of the projection direction, the projection direction of the projection device, or the type of corresponded air guide module (as described in the following). However, in one or more embodiments, the projection device may display the message through projecting a frame to a projection screen.

Next, the user can select one air guide module from a plurality of the air guide module according to the projection direction of the projection device, and set into the projection device to guide the cooling flow to a hot spot with the highest temperature of the light emitting unit of the projection device, as shown in step 530. Substantially, the user checks if the air guide module set into the projection device is correct, as shown in step 540. Checking methods may be disposing a detection device in the projection device for detecting the type of the air guide module, or checking by artificial manual, such as the user can check the air guide module set in the projection device according to a manual of the projection device, but the scope of the present invention does not limit by the aforementioned methods. Then, if the air guide module set in the projection device is correct (step 550), activate the projection device normally (step 560). For example, the projection device can turn on the light emitting unit to project images generated thereof to the projection screen. However, if the air guide module set in the projection device is not correct, as shown in step 570, an error message is displayed on the display screen of the projection device, as shown in step 580. The user can replace the air guide module according to the error message, as shown in step 590. After replacing the air guide module, the user can reboot the projection device, as shown in step 600, and then the user is back to step 520 to do the sensing process of the projection device again, as shown in step 520.

In summary, according to the heat dissipation method according to the embodiments of the present invention, not only the user can select different air guide modules based on the projection direction of the projection device, but also can prevent the user uses the projection device when an incorrect air guide module is set in the projection device, such that the light emitting unit can be prevented from damage after a long period of time of operation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A heat dissipation structure of a projection device, comprising:
    at least one fan having an outlet and for providing a cooling flow;
    at least one light emitting unit for providing a light beam;
    at least one air guide dismountable disposed in front of the outlet of the fan and for guiding the cooling flow to a hot spot of the light emitting unit;
    a sensing device for sensing a projection direction of the projection device; and
    a detection device for detecting if the air guide is disposed in front of the outlet of the fan, and the detection device comprises at least one interlock switch.

2. The heat dissipation structure of claim 1, wherein the sensing device is a gravity sensing device.

3. The heat dissipation structure of claim 1, wherein the light emitting unit and the air guide are combined to be a light emitting module dismountable disposed in front of the outlet of the fan.

4. The heat dissipation structure of claim 3, wherein the detection device is further for detecting if the light emitting module is disposed in front of the outlet of the fan.

5. The heat dissipation structure of claim 4, further comprising a display screen for displaying a detection result of the detection device.

6. The heat dissipation structure of claim 1, further comprising a display screen for displaying a detection result of the detection device.

7. The heat dissipation structure of claim 1, further comprising a display screen for displaying a message of the projection direction of the projection device the sensing device detects.

8. The heat dissipation structure of claim 1, wherein the projection device projects a frame to a projection screen to show a message of the projection direction of the projection device the sensing device detects.

9. The heat dissipation structure of claim 1, wherein the light emitting unit is an ultra high performance lamp.

10. A dissipation method of a projection device, comprising the steps of:
    turning on a projection device comprising at least one fan for generating a cooling flow;
    sensing a projection direction of the projection device;
    selecting one of a plurality of air guide modules and setting up the air guide module into the projection device according to the projection direction of the projection device to guide the cooling flow to a hot spot of a light emitting unit of the projection device; and
    checking if the air guide module is correct;
    displaying an error message on a display screen of the projection device if the air guide module is not correct; and
    replacing the air guide module according to the error message and rebooting the projection device.

11. The dissipation method of claim 10, wherein the step of sensing the projection direction of the projection device comprises the steps of:
    sensing a gravity direction; and
    obtaining the projection direction of the projection device according to the gravity direction.

12. The dissipation method of claim 10, further comprising the steps of:

activating the projection device normally if the air guide module is correct.

13. The dissipation method of claim 10, further comprising the step of:
   displaying a message on a display screen of the projection device according to the projection direction of the projection device.

14. The dissipation method of claim 10, further comprising the step of:
   projecting a frame onto a projection screen for displaying a message according to the projection direction of the projection device.

\* \* \* \* \*